United States Patent [19]

Marandet

[11] Patent Number: 4,509,623
[45] Date of Patent: Apr. 9, 1985

[54] RETARDER EQUIPMENT FOR VEHICLES

[75] Inventor: André Marandet, Saint-Gratien, France

[73] Assignee: Labavia S.G.E., Bois-D'Arcy, France

[21] Appl. No.: 373,060

[22] Filed: Apr. 29, 1982

[30] Foreign Application Priority Data

May 5, 1981 [FR] France .................................. 81 08921

[51] Int. Cl.³ ............................................. F16D 66/00
[52] U.S. Cl. ...................................... 192/4 A; 192/9
[58] Field of Search ................ 192/4 A, 9, 4 R, 12 D, 192/82 T; 188/158, 161, 163; 310/93, 94, 105

[56] References Cited

U.S. PATENT DOCUMENTS

| 1,876,539 | 9/1932 | Apple | 188/158 |
| 1,895,965 | 1/1933 | Bendix et al. | 188/158 |
| 1,968,592 | 7/1934 | Apple | 188/158 |
| 3,609,424 | 9/1971 | Murakami | 310/93 |
| 4,292,556 | 9/1981 | Jollois | 310/94 |

FOREIGN PATENT DOCUMENTS 2906715 8/1979 Fed. Rep. of Germany ...... 188/161

Primary Examiner—George H. Krizmanich
Attorney, Agent, or Firm—Stevens, Davis, Miller & Mosher

[57] ABSTRACT

In vehicle retarding equipment having an eddy-current retarder with four windings, a battery, four control contactors, a five position actuating member and a multiple contactor for under-energizing the retarder by connecting the windings thereof in series, two by two this latter contactor is automatically controlled by opening an appropriate contact, when the real braking torque is reduced to a third of its nominal value at cold, this control being slaved either to the temperature of the rotor armature of the retarder, through a thermocontact mounted in a pocket formed in a pole-shoe of the stator opposite said armature, or to the shifting of the gear box to a low gear position, or to the time during which the actuating member is in its position corresponding to maximum energization.

2 Claims, 5 Drawing Figures

RETARDER EQUIPMENT FOR VEHICLES

The invention relates to retarder equipment for vehicles comprising an eddy-current retarder itself comprising 2n inductor windings, n being an integer at least equal to 2, a DC voltage source and control means actuated by a member with 2n+1 positions for normally causing the retarder to generate 2n+1 distinct braking torques, the values of these torques increasing from zero to a maximum value when the actuating member goes from its zero position to its 2n position, which results in connecting respectively in parallel to the source a number of independent windings increasing from zero to 2n.

As used herein, the term inductor winding or simply winding, means not only an inductor winding properly speaking but also a group of such windings connected together once and for all in series and/or in parallel.

To reduce the heating created by such a retarder, it has already been proposed to provide means for under-energizing this latter, by automatically connecting the windings thereof in series two by two, when the temperature of these windings exceeds a given threshold and by then making inoperative the placing of the actuating member in its even rank positions.

Thus, if n is equal to 2, the first two windings are energized in series for any one of the two positions 1 and 2 of of the actuating member and, further, the other two windings are also energized in series for any one of the two positions 3 and 4 of the actuating member. Under the assumption considered, the electric power dissipated in heat in the retarder for positions 1, 2, 3 and 4 of the actuating member are divided respectively by 2, 4, 3 and 4 with respect to the powers normally dissipated for these same positions.

Independently of the reduction in heating mentioned, the need for which only appears a very long time—generally more than half an hour or even an hour—after the retarder has been brought into operation, the Applicant has observed that the above temporary connections in series, corresponding to under energization of the retarder, result in a very great economy of energy, at the price of reductions in a much smaller ratio of the corresponding braking torque, from the period when this torque has become a small fraction of the nominal torque when cold and has become practically stabilized.

Thus, in the example given above, passing over to the series or "under-energized" connection results, for positions 1, 2, 3 and 4 of the actuating member:

(1) in dividing respectively by 2, 4, 3, and 4 the electric power drawn from the source, and (2) in reducing by about 15 to 20% only the braking torque from the moment when this torque has fallen to about ⅓ of its nominal value when cold.

The Applicant had the idea of using this double observation by fitting to retarder equipment means for automatically passing from the normal energization mode of the retarder to its under energized mode described above as soon as the braking torque due to the retarder is reduced to a given fraction of its nominal value at cold, this fraction being at most equal to half and preferably of the order of a third.

Thus, it becomes possible to operate the retarder under practically permanent working conditions, i.e. even for a very long time - well exceeding half an hour or even an hour as is frequently required in some mountain regions— and this without exhausting the battery of the vehicle.

In fact, if maintaining total energization of all the windings of the retarder results in such exhaustion of the battery beyond a certain period of time, it is not the case when all these windings are energized with a power reduced to a quarter of the preceding one, this considerably reduced power being moreover able to be wholly produced by the alternator of the vehicle without any contribution from the battery.

It should be further noted that the slight loss of torque mentioned above, which is due to the reduction in energization and remains in general less than 20%, does not constitute a drawback in practice, since the longest downhill runs are not in general the steepest.

This loss of torque may moreover be compensated for by the choice of a slightly more powerful retarder for the vehicle concerned, the slight extra investment involved being very rapidly covered by the economy of energy which makes its frequent use possible in under energized working conditions.

In preferred embodiments, recourse is further had to one and/or the other of the following arrangements:

(1) the means for changing over the mode of energization of the retarder are sensitive to the overshooting of a given threshold by the temperature of the armature of the rotor of this retarder, (2) the means mentioned in the preceding paragraph comprise a heat sensitive element housed in a pocket formed in the face of a pole-shoe of the stator in front of which passes the rotor armature, (3) the means for changing over the energization mode of the retarder are sensitive to the shifting of the gearbox of the vehicle down to one of its low-gear or low range positions, (4) the means for changing over the energization mode of the retarder are automatically tripped at the end of a delay $t_1$ after the beginning of energization of this retarder, more especially of energization thereof corresponding to its actuating member being placed in position 2n, and (5) the delay $t_1$ according to the preceding paragraph is between 5 and 10 minutes.

The invention comprises, apart from these main arrangements, some other arrangements which are used preferably at the same time and which will be more explicitly discussed hereafter.

In what follows, preferred embodiments of an invention will be described with reference to the accompanying drawings in a way which is of course in no wise limiting.

FIG. 1, of these drawings, is the electrical diagram of vehicle retarder equipment constructed in accordance with the invention.

Figure 1:
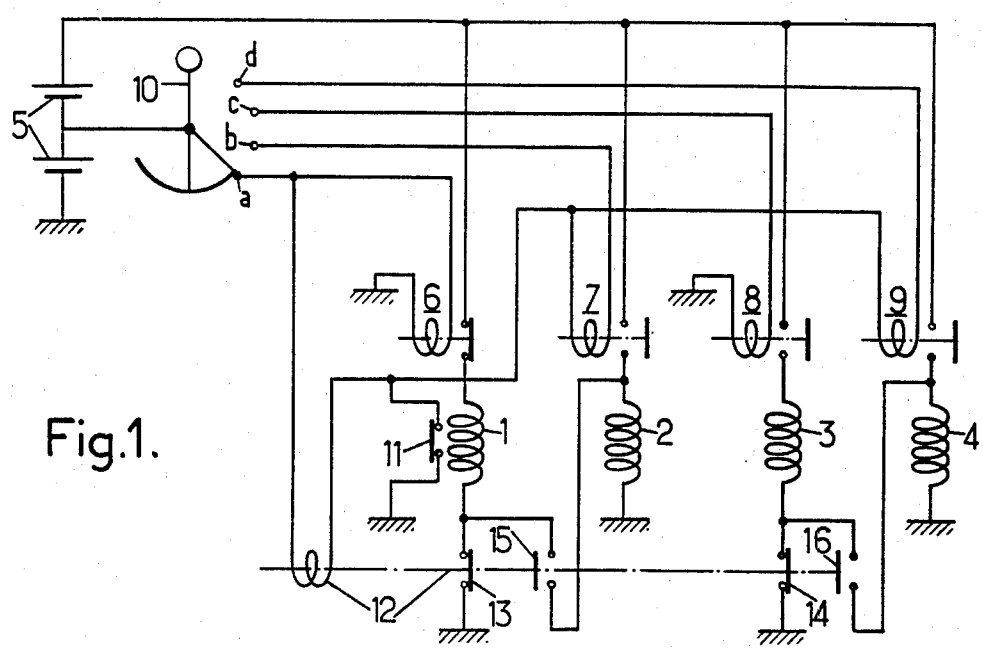

In a way known per se, each vehicle retarder means, more particularly for heavy vehicles, comprises:

(1) an eddy-current retarder itself comprising four inductor windings 1, 2, 3 and 4, each formed more especially by two pairs of coils, the two coils of each pair being connected in series together and the two pairs being connected in parallel together, (2) a battery 5 adapted to generate a DC current at a voltage of amplitude V, generally equal to 24 volts, (3) four contactors 6, 7, 8 and 9, each adapted to control the electrical connection between one of the windings 1, 2, 3 and 4 and battery 5, and (4) a five position control member 10, one position of which, so-called zero position in the present description, corresponds to the off position, i.e. de-energization of the retarder. Member 10 adapted to connect successively and cumulatively, to a part of battery 5, four studs a, b, c and d, connected respectively to the four contactors 6, 7, 8 and 9 and so to supply successively and cumulatively these four contactors from a portion of the voltage V.

The ground returns of the coils of the two contactors 6 and 8 are made directly, but not the ground returns of the coils of the other two contactors 7 and 9, which are made through a normally closed contact 11, which will be described further on.

There is further provided a quadruple contactor 12 whose coil is supplied like that of contactor 6 from stud a and is grounded through contact 11.

For the energized position of the quadruple contactor 12, shown in figure 1—which position is the normal working position of the retarder, for example at the beginning of operation—two of the contacts 13 and 14 of this quadruple contactor connect respectively to ground the two windings 1 and 3, and the other two contacts 15 and 16 of said contactor remain open, which leaves undisturbed the usual connection of the other two windings 2 and 4, in parallel across their counterparts 1 and 3.

On the other hand, for the unenergized position (not shown) of the quadruple contactor 12, due to opening of contact 11 in the way described further on, the ground returns of the first two windings 1 and 3 are cut off by the opening of contacts 13 and 14, and on the contrary, the closing of the two contacts 15 and 16 connect respectively in series winding 2 with winding 1 and winding 4 with winding 3.

Thus, the successive energization of contactors 6, 7, 8 and 9 due to rotation of member 10 results respectively:

(1) in the series energization of the two windings 1 and 2, (2) in nothing further, the ground return of contactor 7 not being able to be made because of the opening of contact 11, (3) in the series energization of the two windings 3 and 4, adding its effect to the series energization of the two windings 1 and 2, but independently thereof, and (4) by nothing further, the ground return of contactor 9 not being able to be made because of the opening of contact 11.

With respect to the normal energization mode corresponding to FIG. 1, the energization mode which has just been described, and which corresponds to the series connection of windings 1 and 2, on the one hand, and of windings 3 and 4, on the other, results in a considerable reduction in the electric power consumed by the retarder.

In particular, for position 4 of member 10 corresponding to maximum energization of the retarder, this consumed power is divided by four.

As we discussed above, this considerable reduction in the power consumed only results in a very small reduction of the retarding torque generated from the moment when the real retarding torque has become stable at a relatively small fraction of the nominal torque at cold.

By way of illustration, it may be mentioned that, for position 4 of member 10 and for a relatively low speed of rotation of the rotor of the retarder, i.e. of the order of 1000 rpm, the real torque in question is reduced, as a result of heating up, to about a third of its initial value after seven minutes operation and that the loss of torque then due to changing over the energization mode of the retarder described above is only about 15 to 20% for a consumed power reduced to a quarter of that observed just before the change-over.

Figure 2:
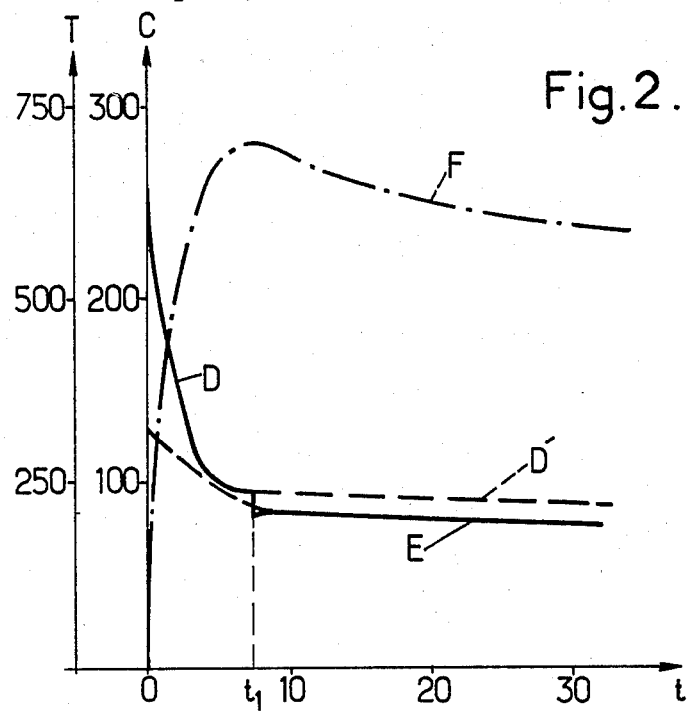
FIG. 2 is a graph explaining the operation of this equipment.

This phenomenon is clearly seen in the graph of figure 2, in which the braking torque C of the vehicle is shown as ordinates, expressed in m.daN, and the time t expressed in minutes is shown as abscissa.

The continuous line curve D shows the initial operating phase during which the retarding torque drops first of all very rapidly from 300 m.daN to 200 m.daN, then more slowly down to 90 m.daN.

This curve D is interrupted at the abscissa corresponding to a maximum energization time $t_1$ equal to 7 minutes.

The broken line curve D' shows what the torque in question would have been if the initial energization mode had been maintained beyond time $t_1$.

The continuous line curve E shows the evolution of the real torque from time $t_1$ corresponding to changing over the energization mode in accordance with the invention. It can be seen, in comparison with curve D', that from this time the observed torque reduction is relatively small whereas the energization power is divided by four.

Figure 3:
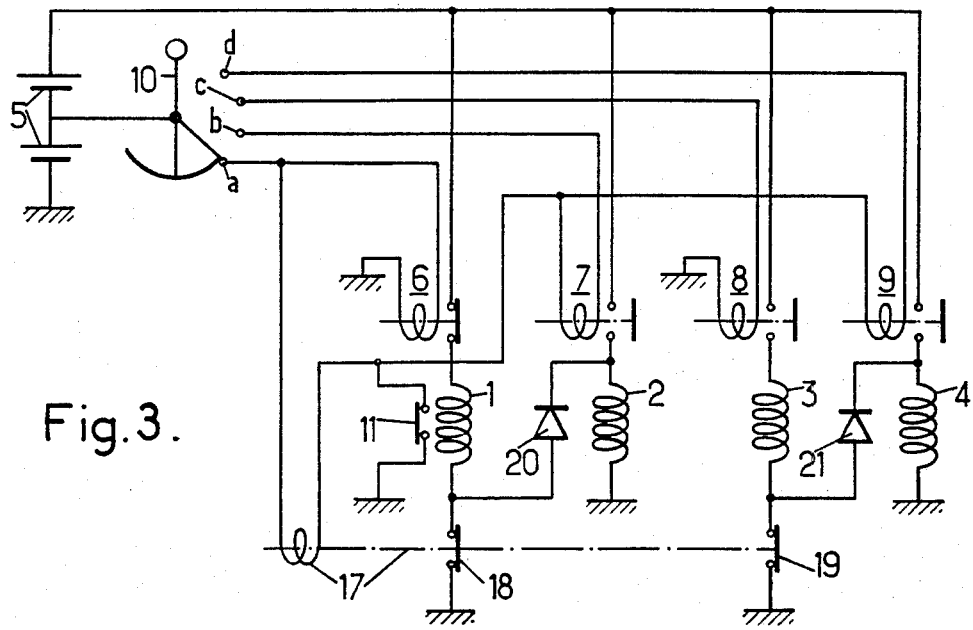
FIG. 3 is an electrical diagram of a variation of the equipment of FIG. 1.

Instead of being provided by a quadruple contactor 12 as in the case of FIG. 1, switching over the parallel and series energization modes of the retarder may be provided, as shown schematically in FIG. 3, by means of a double contactor 17 whose two contacts 18 and 19 are connected in the ground returns of the two windings 1 and 3 like the preceding contacts 13 and 14.

The roles of the preceding contacts 15 and 16 are then filled by two diodes 20 and 21, the first one 20 connecting the output of winding 1 to the input of winding 2 and the second one 21 connecting the output of winding 3 to the input of winding 4.

When the double contactor 17 is energized, i.e. when member 10 is in any one of its working positions and contactor 11 remains closed, the two windings 1 and 3 are grounded through respectively closed contacts 18 and 19.

In this case, the energization of contacts 6 (or 8) results in winding 1 (or 3) being supplied with power, and only a negligible portion of the current leaving this winding then passes through winding 2 (or 4), which is indeed connected in series with said winding 1 (or 3), but also in parallel across closed contact 18 (or 19).

It is only when this latter contact is open, by deenergization of the double contactor 17—itself due to the opening of contact 11—that the energization current of winding 1 (or 3) is forced to pass in full through winding 2 (or 4) connected in series therewith to ground.

Some of the means will now be described provided in accordance with the invention for replacing the normal parallel energization mode of the retarder by its underenergized series mode from the time when the low retarding torque loss which results from this replacement is justified by the corresponding considerable economy in energy.

According to a first embodiment, these means are sensitive to the overshooting of a given threshold by the temperature of the rotor armature, of the retarder, in which are generated the eddy-currents generating the braking torque.

This armature is generally formed by one or two ferromagnetic disks each travelling past a ring of pole-shoes of the stator which present alternately polarities of opposite signs.

To detect the temperature of the rotor armature, there is provided in one of the these pole-shoes (FIGS. 4 and 5) a pocket 23 open in the direction of the armature, i.e. hollowed out in face 24 of this pole-shoe which defines with this armature an air-gap of the retarder and in this pocket 23 is housed a thermocontact forming the above contact 11.

The thermocontact is advantageously held in its pocket by sealing with a temperature resistant resin such as the one known under the name of Araldite.

In the embodiment illustrated, the pole-shoe considered is a trapezoidal plate fixed by screwing to the axial end of the core of an electromagnet whose coil 25 forms one of the windings 1 to 4 or more precisely a portion of one of these windings.

Figure 4:
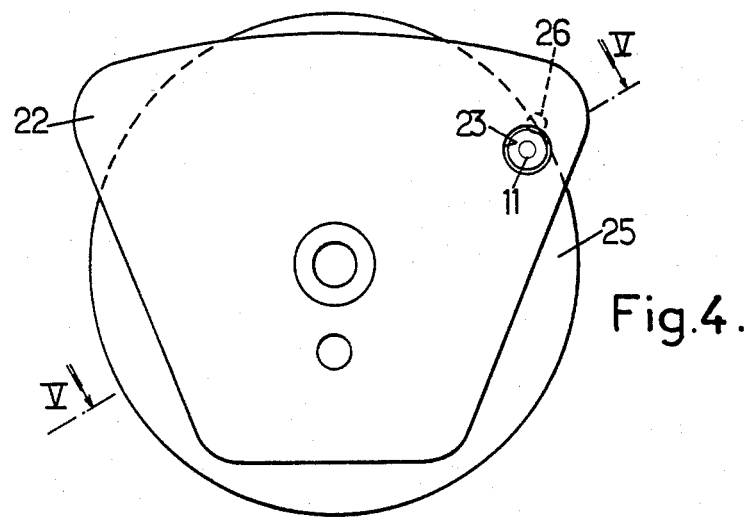
FIGS. 4 and 5 show, respectively in a front view and in section along V—V, FIG. 4, a pole-shoe of a retarder stator associated with a coil thereof and equipped in accordance with the invention with an element adapted to detect the temperature of the rotor of this retarder.
Figure 5:
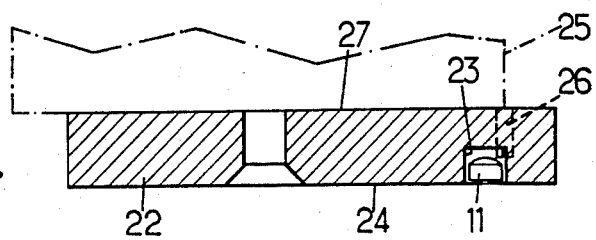

There can also be seen in FIGS. 4 and 5 a bore 26 formed in face 27 of pole-shoe 22 opposite face 24, which bore communicates with the bottom of pocket 23. Bore 26 serves for receiving the electrical connection wires which connect the thermocontact 11 to the rest of the electric circuit.

The temperature threshold corresponding to actuation of this thermocontact is for example 160° C.

The dash-dot line curve F shown in FIG. 2 shows the evolution in time of the temperature T of the rotor of the retarder, this temperature T being expressed in degrees centigrade in the left-hand graduation of this FIG. 2.

It can be seen that said temperature increases rapidly to reach a maximum of the order of 700° C. after 3 or 4 minutes, heating the thermocontact by radiation and causing actuation thereof three or four minutes later, the heating of this latter not being instantaneous.

The temperature of the rotor then decreases progressively but thermocontact 11 is adapted so that its contact only closes again when its temperature drops to a second pre-determined threshold less than the first one.

According to a second embodiment, the change-over of the energization mode of the retarder is slaved to the shifting down of the gear-box of the vehicle to a low-gear position, i.e. belonging to a low-speed range.

In fact, the under-energization operating conditions described above are only truly advantageous in practice for prolonged slowing down required when the vehicle runs for a long time downhill, this slowing down complementing the decelerating effect due to the engine-braking effect obtained by causing the assembly of the gear-box and the engine to be driven by the vehicle through a gear ratio corresponding to a low gear or low speed position.

On the other hand, when the ratio provided by the gear-box corresponds to the high speed range thereof, i.e. the high gears of the vehicle or to travelling on the flat, the retarding needs are relatively brief and never reach the relatively long times generally greater than 5 minutes to which the above under-energization operating conditions relate.

For this second embodiment, contact 11 may be formed by a microswitch controlled directly or not by the lever of the gear-box or else by one of the mobile parts of said box.

According to a third embodiment, changing over from the normal energization mode of the retarder to the under-energized mode thereof is controlled by timing means automatically tripped after a pre-determined delay $t_1$, following each beginning of energization of the retarder or each time the actuating member 10 is placed in its position corresponding to maximum energization of this retarder.

This delay $t_1$ is preferably between 5 to 10 minutes, being for example of the order of 7 to 8 minutes. As was mentioned earlier, the heating up of the retarder due to energization thereof during such a period of time results in reducing the real braking torque generated by this retarder to a relatively small and substantially stabilized fraction of its nominal value at cold, which fraction is of the order of a third for a relatively low speed of the vehicle corresponding to a rotational speed of the rotor of the order of 1000 rpm.

An identical reduction of torque might be observed more rapidly for a higher speed of the vehicle, for example after 2 minutes only for a speed of the rotor of the retarder of about 3000 rpm. Such an assumption is not excluded here, but seems less advantageous than the preceding one since the invention is more especially intended for braking vehicles engaged on downhill runs which are certainly very long but moderately sloped, which corresponds to low travelling speeds.

The timing means considered, formed in any desirable way, are advantageously mounted so as to be automatically brought into use by the arrival of actuating member 10 in its position corresponding to maximum energization, the opening of contact 11—which causes the energization mode of the retarder to change over to the under-energized mode thereof—being then controlled automatically at the time of delay $t_1$ subsequent to that of the above arrival if, of course, the position of the actuating member has not been modified meantime.

Following which are whatever the embodiment adopted, retarder equipment is finally provided whose construction, operation and advantages particulary the possibility of efficient operation independently of the duration without running down the battery, follow sufficiently from what has gone before.

As is evident, and as it follows moreover already from what has gone before, the invention is in no wise limited to those of its modes of application and embodiments which have been more especially considered ; it embraces, on the contary, all variations thereof.

I claim:

1. Retarder equipment for vehicles comprising an eddy-current retarder which comprises 2n inductor windings, n being an integer at least equal to 2, a DC voltage source, control means actuated by an actuating member with 2n+1 positions for normally causing the retarder to generate 2n+1 distinct braking torques, which torques have values increasing from zero to a maximum value when the actuating member goes over from its zero position to its 2n position, which results in connecting respectively in parallel to the DC voltage source a number of independent windings increasing from zero to 2n, and means for under-energizing the retarder by automatically connecting its windings in series two by two, the means for under-energizing the retarder being responsive to overshooting of a given threshold by a temperature of a rotor armature of the retarder, said means for under-energizing comprising a thermosensitive element mounted on a stator of the retarder at a position of said stator in front of which passes said rotor armature.

2. Retarder equipment according to claim 1, wherein the thermosensitive element is housed in a hollow pocket in a face of a pole-shoe of the stator of the retarder.

* * * * *